Feb. 23, 1960    J. W. CLARK ET AL    2,926,262
NUCLEONIC X-RAY APPARATUS
Filed Sept. 6, 1955    3 Sheets-Sheet 1

JOHN W. CLARK,
LOREN R. WILSON,
INVENTORS

BY
Seymour M. Rosenberg
ATTORNEY

JOHN W. CLARK,
LOREN R. WILSON,
INVENTORS

BY

ATTORNEY

Feb. 23, 1960     J. W. CLARK ET AL     2,926,262
NUCLEONIC X-RAY APPARATUS
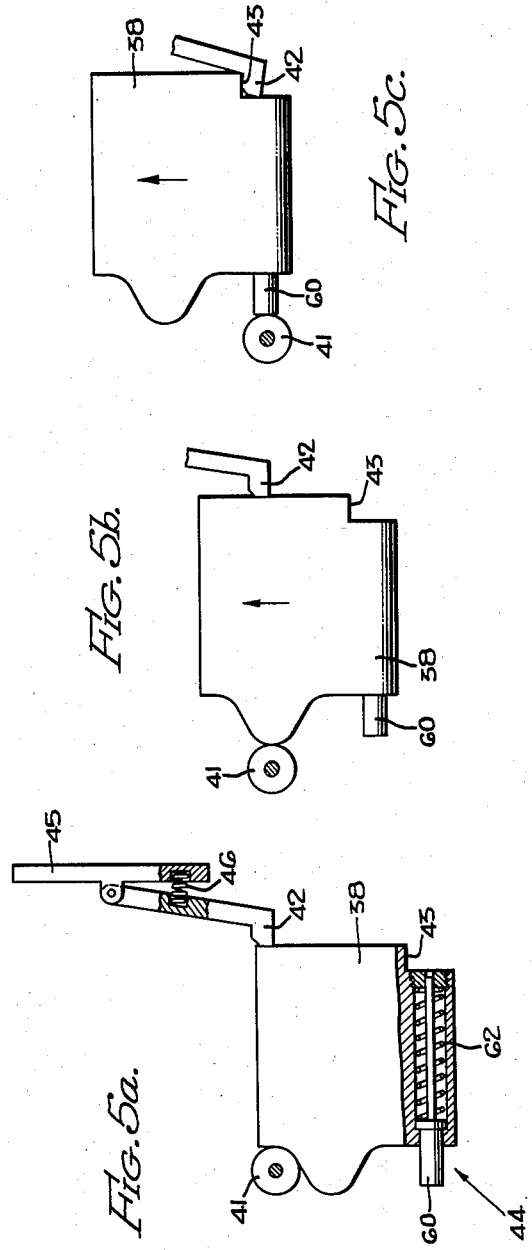
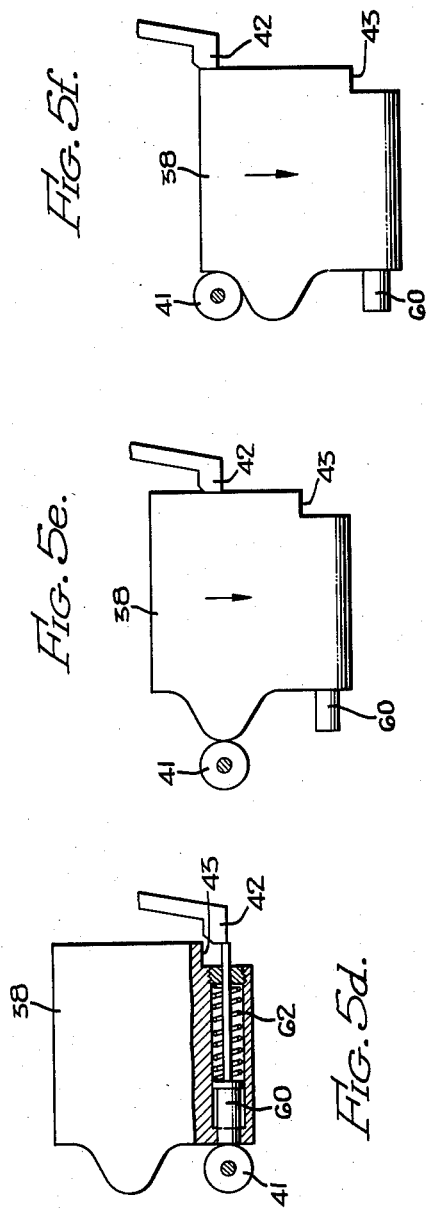
JOHN W. CLARK,
LOREN R. WILSON,
INVENTORS
BY
Seymour M. Rosenberg
ATTORNEY

United States Patent Office 2,926,262
Patented Feb. 23, 1960

2,926,262

NUCLEONIC X-RAY APPARATUS

John W. Clark, Santa Monica, and Loren R. Wilson, Pacific Palisades, Calif., assignors to Litton Industries, Inc., Beverly Hills, Calif.

Application September 6, 1955, Serial No. 532,721

5 Claims. (Cl. 250—105)

This invention relates to nucleonic X-ray apparatus, and more particularly to nucleonic X-ray machines employing a presettable timing mechanism for automatically controlling exposure time.

Relatively recent discoveries of radioactive isotopes having emission characteristics suitable for X-ray analysis and photography have resulted in the construction of nucleonic X-ray apparatus which are employed both in industry and in medicine in place of electronic X-ray machines. For example, Cobalt-60 is now becoming widely used in industry for non-destructive testing through X-ray photography, and in medicine for X-ray therapy. On the other hand, lower energy nucleonic X-ray sources, such as Thulium-170, for example, are also being utilized for industrial analysis, and in addition, for medical diagnosis through X-ray photography. The principal advantages of these machines are that they are either portable or easily moved about, that they do not require any associated high voltage power supplies, and that they are relatively simple to operate and maintain.

In the prior art, one of the chief disadvantages of nucleonic X-ray apparatus as opposed to electronic X-ray apparatus has been that exposure time must be manually controlled through the operation of a lead shutter mechanism which normally blocks an aperture in a lead shield which houses the nucleonic X-ray source, but which is withdrawn from the aperture during operation to permit X-rays or gamma-rays from the source to irradiate a desired specimen or object. The electronic X-ray machines of the prior art, on the other hand, are readily timed automatically through electronic devices which delimit the exposure time of the machine by merely controlling the electrical energization of the X-ray tube.

According to the present invention there is provided a nucleon X-ray apparatus which includes as an integral part thereof a presettable mechanical or electromechanical timer which is operative to control the exposure period through which an associated shutter is withdrawn from an aperture in an associated shielded housing member. More specifically, according to the basic concept of the invention, the nucleonic X-ray apparatus herein disclosed includes a presettable timer which is actuated upon withdrawal of the shutter from the housing aperture and which is operative after a predetermined exposure period to in turn actuate a return mechanism for automatically restoring the shutter to its normal or blocking position within the aperture.

According to the preferred embodiment of the invention, the shutter is held in its normal or blocking position by an associated spring mechanism and is withdrawable from the aperture by rotation about a hinge until a latch or detent stop position is reached, at which time the shutter is retained in its open position by an associated latch. Simultaneous with rotation of the shutter to its open position, an associated cam affixed to the shutter mechanism and rotatable therewith is utilized to engage and actuate a presettable mechanical or electromechanical timer which functions to clock the interval to which it has been preset, at the end of which interval the timer is operable to disengage the hold latch from the shutter and thereby permit the shutter to return to its normal or blocking position under the urging of the associated spring mechanism.

In accordance with the invention the preferred embodiment of the nucleonic X-ray apparatus herein disclosed also includes a visual indicator mechanism which displays an indicia for visually indicating when the shutter is removed from the shield, or in other words, when irradiation is taking place. In addition, the apparatus further includes an emergency release mechanism which may be employed to manually disengage the hold latch from the radiation shutter even prior to the end of the exposure period.

It is, therefore an object of the invention to provide nucleonic X-ray apparatus which include as an integral part thereof a timing mechanism for controlling exposure time.

Another object of the invention is to provide nucleonic X-ray apparatus which include a presettable timing mechanism which is operative to automatically control the period through which an associated shutter is withdrawn from a shielding member which houses a nucleonic X-ray source.

A further object of the invention is to provide nucleonic X-ray machines wherein removal of the shutter from the housing which envelopes the nucleonic source serves to actuate a timing mechanism which is operative to restore the shutter to its normal position at the end of a predetermined interval.

Still another object of the invention is to provide nucleonic X-ray apparatus wherein irradiation is commenced by withdrawing a shielding shutter from an aperture blocking position to a hold position, the removal of the shutter functioning to actuate a timer which clocks a predetermined interval and then restores the shutter from the hold position to its aperture blocking position.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Fig. 2 is an isometric view of the cooperating elements of the timing mechanism which is employed in the apparatus of Fig. 1;

Figs. 5A thru 5F are developed views of portions of the timing mechanism of Fig. 2 illustrating the operational sequence of the timing mechanism.

Figure 1:
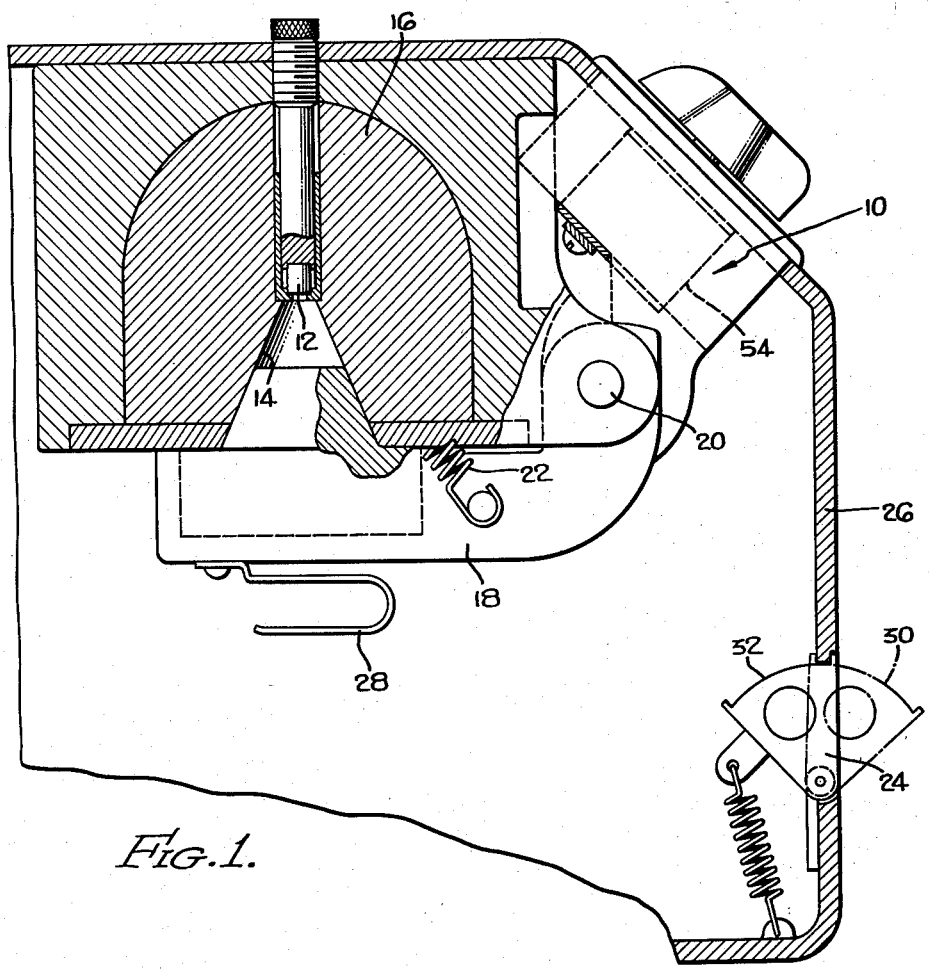
Fig. 1 is a side elevation, partly in section, of one form of nucleonic X-ray apparatus which utilizes an exposure timing mechanism, according to the invention.

With reference now to the drawings, wherein like or corresponding parts are designated by the same reference characters throughout the several views, there is shown in Fig. 1 a preferred embodiment of the nuclenoic X-ray apparatus of the invention which includes a timing mechanism, shown only in outline in Fig. 1 and generally designated 10, for selectively controlling the time interval through which radiation from a nucleonic X-ray capsule source 12 is permitted to radiate through an aperture 14 in a shielded source housing 16 upon withdrawal from the aperture of a shielded radiation shutter 18. As shown in Fig. 1, shutter 18 is preferably conical in shape and is rotatable in accordance with rotation of a hinge shaft 20 from a normal or blocking position within aperture 14 to an open or exposure position whereat it is removed from the cone of radiation from source 12.

As indicated previously, source 12 may comprise a relatively high energy gamma ray source, such as Cobalt-60, or a relatively low energy source such as Thulium-170, for example, the particular isotope employed being selected in view of the particular use to which the X-ray apparatus is to be applied. It will also be recognized that the dimensions of housing 16 and shutter 18, as well as the thickness of the lead shielding employed therein, will be dictated principally by the radiation characteristics of the source utilized, the thickness of the shielding and shutter being calculated by methods well known in the art and depending upon the energy of the radiation and upon the quantity of radioactive material employed.

The nucleonic X-ray apparatus of the invention also preferably includes one or more conservatively designed return springs, such as spring 22, which intercouple housing 16 with shutter 18 and which normally urge the shutter to its normal position within the aperture in the associated housing. In addition the apparatus may be equipped with a spring loaded radiation indicator 24 which is hingedly mounted on a casing 26 which in turn envelopes housing 16 and the associated mechanical elements which cooperate therewith. In operation, when shutter 18 is rotated to its open position, indicator 24 is engaged by a leaf spring 28 which is affixed to the shutter and is moved to an exposure position as indicated by the dotted line 30; in this position a warning decal affixed to surface 32 of indicator 24 provides a visual indication that radiation is emanating from the aperture in the housing member.

With reference now to Fig. 2, there is shown in diagrammatic form the various elements of timing mechanism 10 and the manner in which they cooperate with each other. In addition, Fig. 2 illustrates one form of actuator which may be utilized for initially opening shield 18, the particular actuator shown in this instance comprising a crank or sprocket 34 which is selectively engageable with a mating sprocket 36 affixed to hinge shaft 20 for moving shutter 18 from its normal position to its open or exposure position. In order to assure maximum safety, sprocket 34 is preferably spring loaded so that it must first be moved axially to engage shaft 20 before rotation of the sprocket can rotate the shutter to its open position.

Consider now the elements of timing mechanism 10. As shown in Fig. 2, the timing mechanism comprises four basic components, namely; a cam 38 affixed to hinge shaft 20 and rotatable with shutter 18 upon removal of the shutter from the aperture in the housing member, a presettable mechanical or electromechanical timer 40, shown in outline form and including a cam follower 41, the timer being actuatable upon rotation of cam 38 for timing the exposure interval, a spring loaded hold latch 42 which is operative to engage a notch 43 in cam 38 upon rotation of the cam and thereby retain the shutter in its open position, and a latch release linkage, generally designated 44, which is actuated by timer 40 at the end of the exposure interval to disengage latch 42 from cam 38 and thereby permit the shutter to be returned to its normal position under the urging of spring 22.

It will be noted from Fig. 2 that latch 42 is hingedly mounted on a mounting bracket 45, the mounting bracket including a spring well for seating a compression spring 46 which urges latch 42 against the right hand end of cam 40. Although not illustrated in Fig. 42, the mounting bracket is in turn affixed to the side of the nucleonic X-ray source housing member opposite to the side from which the view of Fig. 1 is taken. It will also be noted in Fig. 2 that the nucleonic apparatus of the invention may further include an emergency release rod 47 which may be employed during operation to release latch 42 from cam 38 prior to the end of the exposure period. The manner in which the emergency release rod is mounted and its position relative to timer 40 will be discussed in more detail hereinbelow with respect to the description of Fig. 4.

Figure 3:
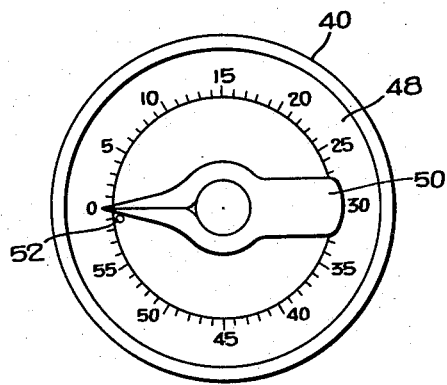
Figs. 3 and 4 are views of one form of commercial timer which may be employed in the timing mechanism of Fig. 2.
Figure 3:
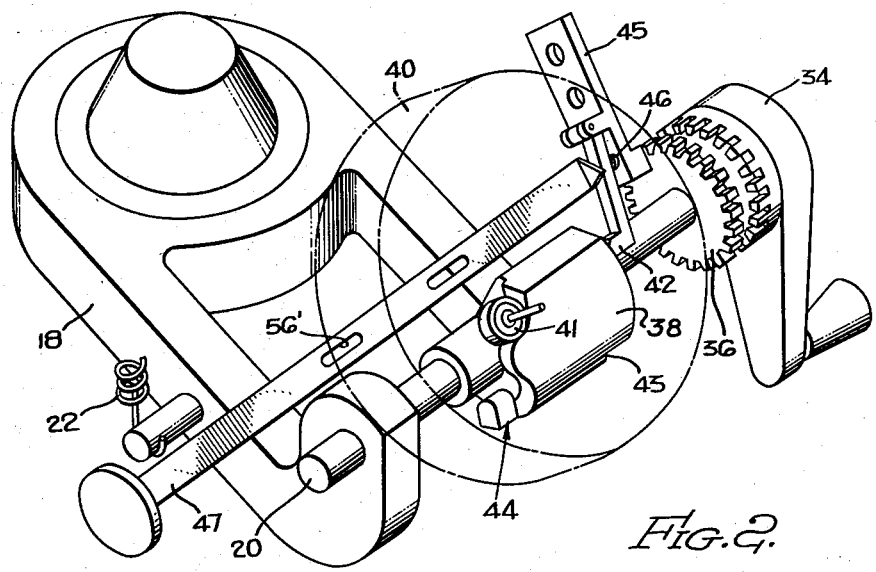
Figure 4:
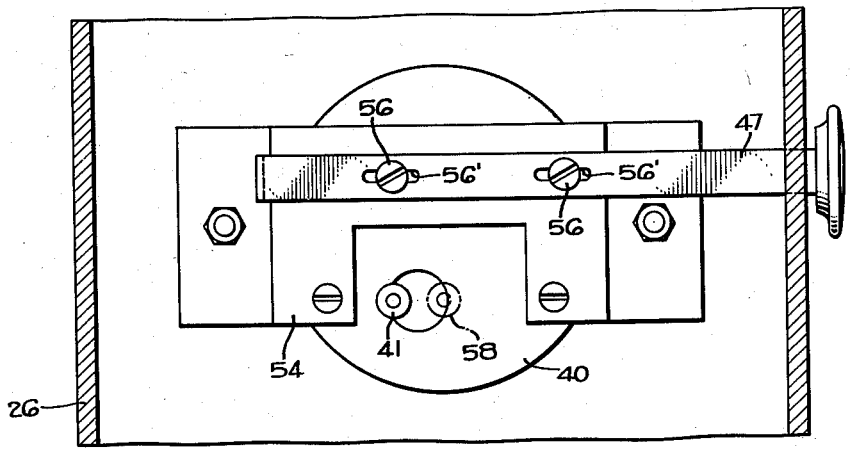

Timer 40 may be any conventional mechanical or electromechanical timer which is presettable to meter a predetermined time interval. With the particular cam shape employed in the embodiment of the invention shown in the drawings, the timer is preferably actuable to start timing by a substantially linear movement of cam follower 41, and is operative at the end of the interval being timed to return its follower element to its normal or starting position. With reference now to Figs. 3 and 4, there are shown front and back views, respectively, of one form of commercially available mechanical timer which meets the above specifications and which is operative to time for any desired interval up to one minute. This particular timer has been found to be especially suitable for use in a nucleonic X-ray apparatus, constructed in accordance with the invention, which employs a Thulium-170 isotope source for low energy radiography, the timer being sold by M. H. Rhodes, Inc. of Hartford, Connecticut under the trade designation "Mark Time" timer No. 4919.

Referring now with particularity to Fig. 3, the timer includes a face plate 48 with a graduated scale, and a rotatable time selector knob 50 which is rotatable from a normal position against a stop 52 to any desired interval setting up to one minute. When the timer is actuated by its associated cam follower element, as described more fully hereinbelow, the time selector knob moves back to its normal position as the timing interval is clocked off, and is fully returned to its normal position as the timing interval ends.

With reference now to the rear view of timer 40 illustrated in Fig. 4, it will be noted that the timer is mounted in a recessed mounting bracket 54 which is in turn mounted on casing 26, the sectioned sides of casing 26 shown in Fig. 4 corresponding to the sides of the casing shown in Fig. 1. It may also be seen from Fig. 4 that mounting bracket 54 serves as a mounting element for emergency release rod 47 which is maintained in a laterally slidable position by a pair of shoulder screws 56 which pass through a pair of slots 58 in the emergency release rod. In addition to disclosing the relation of the foregoing elements, Fig. 4 also illustrates the normal position of cam follower 41 with respect to the timer and the timing position to which follower 41 is laterally moved by the cam shown in Fig. 2 when the timer is actuated to start clocking the radiation exposure interval, the timing position of the follower being designated by the dotted lines 58. It will be recalled that once the timer has been actuated follower element 41 remains in timing position 58 until the end of the timing interval at which time the follower element is returned by the timer to its normal position.

Consider now the manner in which the cam follower, cam, and latch mechanism shown in Fig. 2 cooperate automatically to actuate the timer, to retain the shutter in its open position during the exposure interval, and to release the shutter to return it to its normal or closed position at the end of the exposure interval. The description of operation of these elements of the nucleonic X-ray apparatus of the invention will be undertaken with reference to Figs. 2 and 5A thru 5F, in the latter of which cam 38 of Fig. 2 is developed in a plane taken through the cam follower bearing and latch 42.

With reference now to Figs. 2 and 5A, the relationship of cam 38, follower 41 and latch 42 is illustrated as it exists before the nucleonic X-ray apparatus is rendered operative to irradiate a desired specimen of object. In addition, Fig. 5A also illustrates the cooperating parts of latch release linkage 44, which basically includes a plunger 60 one end of which normally extends from the lower left section of the cam, as viewed in the drawings, under the force of a spring 62. In operation the plunger is axially movable to the right against the urging of spring 62 to extend its opposite end into notch 43 in the cam.

Assume now that the timer 40 has been preset to time a predetermined time interval through which it is desired to expose a specimen to radiation. Crank 34 in Fig. 2 is first moved axially to engage sprocket 36 and is thereafter rotated in a clockwise direction, as viewed from the end of the crank, thereby rotating hinge shaft 20, shutter 18 and cam 38 in the same direction against the urging of spring 22. With reference now to Fig. 5B it will be noted that upon rotation of the cam, the lobe of cam 38 functions to drive follower 41 to its timer actuator position corresponding to position 58 in Fig. 4, at which time the timer is actuated and starts to clock the interval to which it has been preset.

Substantially simultaneous with the actuation of the timer, the radiation shutter is swung clear of the radiation cone defined by the aperture in the housing which confines the isotope X-ray source, thereby exposing the specimen or object being operated upon to irradiation. Meanwhile, as the shutter moves to its fully open position, cam 38 is rotated until, as shown in Fig. 5C, latch 42 engages notch 43 in the cam and locks the shutter in its open or exposure position, while follower 41 is positioned adjacent plunger 60. Thereafter the release of crank 34 will not disturb the radiation shutter.

Continuing with the description of operation, after the exposure period has terminated, timer 40 functions, as set forth previously, to return cam follower 41 to its normal position, as viewed in Fig. 5D, and thereby drives plunger 60 to the right to expel latch 42 from notch 43; consequently, spring 22 in Fig. 2 forces shutter 18 and cam 38 back to their normal positions. During the return operation, as shown in Fig. 5E, cam follower 41 is again set to the timer actuator position momentarily. However, owing to the fact that the timer has run-down, or in other words that the time selection knob has returned to zero, no timing operation takes place and the follower continues to follow cam 38 back to the normal or starting position shown in Fig. 5F.

It will be recognized from Fig. 2, of course, that if an emergency were to occur prior to the end of the timing interval so that it would be desirable to terminate the radiation process at once, pressure on the end of release rod 47 would disengage latch 42 from notch 45 prematurely, thereby permitting the radiation shutter to swing to its closed position at once. It will also be recognized from the description set forth hereinabove that unless timer 40 is preset to time some predetermined time interval it is impossible to actuate the nucleonic X-ray apparatus to irradiate an object for more than a brief instant unless the shutter is held open manually with crank 34. More specifically, if timer 40 is set to zero, and an attempt is made to operate the apparatus, follower 41 will continuously follow the surface of cam 38 so that plunger 60 in the latch release mechanism will prevent latch 42 from seating in notch 43. Consequently, in such an instance the radiation shutter can only be held open against the urging of spring 22 by manually keeping crank 34 continuously engaged with hinge shaft 20 and in its rotated position.

It is obvious, of course, that numerous other modifications and alterations may be made in the nucleonic X-ray apparatus of the invention herein disclosed without departing from the spirit and scope of the invention. For example, numerous other forms of cams known to the art could be employed for actuating the same or other form of mechanical timers. Again, the latch employed for holding the shutter in its open or exposure position could latch to the shutter itself or some auxiliary component rotatable therewith, instead of to a notch in the cam. In addition, the latch release linkage could be external of the cam and merely intercouple the timer with the latch without being associated with the cam. Accordingly, it is to be expressly understood that the invention herein disclosed is to be limited only by the spirit and scope of the appended claims.

What is claimed as new is:

1. In a nucleonic X-ray apparatus wherein a nucleonic X-ray source is housed within a shielded housing member having an aperture therein, and wherein an associated shielding shutter is normally maintained in an aperture blocking position but is rotatable against the urging of an associated return spring and with an associated hinge shaft to an open position whereat radiation from the nucleonic source emanates through the aperture, a timing mechanism for automatically delimiting the exposure period to a predetermined time interval, said timing mechanism comprising: cam means coupled to the shutter and rotatable therewith; a timer presettable to said predetermined time interval and positioned adjacent said cam means, said timer including a cam follower element having a normal position in contact with said cam means and being movable to a timer actuator position by rotation of said cam means ot actuate said timer to time said predetermined interval, said timer being operative to return said follower element to substantially its normal position at the end of said predetermined interval; latch means operative in response to opening of the shutter for normally holding the shutter in its open position; and latch release means operative in response to the return of said follower element to its normal position for releasing said latch means whereby the shutter is permitted to return to its aperture blocking position under the urging of its associated return spring.

2. The combination defined in claim 1 wherein said cam means is affixed to the shutter hinge shaft and is rotatable therewith, said cam means further including a notch in one side thereof adapted to be engageable by said latch means when the shutter is rotated to its open position.

3. The combination defined in claim 2 wherein said latch release means comprises a spring loaded plunger integral with said cam and communicating between said notch and a point contiguous to said follower element when the shutter is open, said follower element being operative in returning to its normal position at the end of said predetermined interval to engage said plunger and drive said plunger into said notch to expel said latch means therefrom.

4. The combination defined in claim 3 which further includes an emergency release rod positioned adjacent said latch means, and operative in response to manual pressure to disengage said latch from said notch whereby the shutter may be returned to its aperture blocking position prior to the end of said predetermined interval.

5. The combination defined in claim 1 wherein said timing mechanism further includes a visual indicator having affixed thereto an indicia indicating that radiation is taking place, said visual indicator being operative in response to rotation of the shutter to its open position to display said radiation indicating indicia.

References Cited in the file of this patent
UNITED STATES PATENTS

| | | |
|---|---|---|
| 2,486,089 | Zavales | Oct. 25, 1949 |
| 2,664,037 | Debrie | Dec. 29, 1953 |
| 2,670,443 | Pennock | Feb. 23, 1954 |
| 2,719,926 | Procter | Oct. 4, 1955 |
| 2,846,588 | Berger | Aug. 5, 1958 |
| 2,847,581 | Clark | Aug. 12, 1958 |